United States Patent
Wang et al.

(10) Patent No.: US 7,549,058 B1
(45) Date of Patent: Jun. 16, 2009

(54) METHOD AND APPARATUS FOR ENCRYPTING AND DECRYPTING DIGITAL DATA

(75) Inventors: Bei Wang, Los Angeles, CA (US); Chia-Hung Yeh, Tainan (TW); Hsuan-Huei Shih, Taipei (TW); C.-C. Jay Kuo, Arcadia, CA (US)

(73) Assignee: MAVs Lab. Inc., Tau-Yuan (TW)

( * ) Notice: Subject to any disclaimer, the term of this patent is extended or adjusted under 35 U.S.C. 154(b) by 806 days.

(21) Appl. No.: 11/172,369

(22) Filed: Jun. 30, 2005

(51) Int. Cl.
*H04L 9/32* (2006.01)
*H04L 9/00* (2006.01)
*H04N 7/167* (2006.01)

(52) U.S. Cl. .................. 713/189; 713/181; 380/217

(58) Field of Classification Search ............ 380/46, 380/200, 212, 277, 42, 217; 713/189, 181
See application file for complete search history.

(56) References Cited

U.S. PATENT DOCUMENTS 4,646,061 A * 2/1987 Bledsoe ................. 341/65
4,897,717 A * 1/1990 Hamilton et al. ........ 375/240.07

OTHER PUBLICATIONS

Dahua Xie and C.-C. Jay Kuo, Enhanced Multiple Huffman Table (MHT) Encryption Scheme Using Key Hopping, IEEE, V-568-V-571, 2004.
Chung-Ping Wu and C.-C. Jay Kuo, Design of Integrated Multimedia Compression and Encryption Systems.

* cited by examiner

*Primary Examiner*—Hosuk Song
(74) *Attorney, Agent, or Firm*—Baker & McKenzie LLP

(57) ABSTRACT

A method and apparatus for encrypting and decrypting digital data employing multiple Huffman tables and at least one encryption key to enhance security of the digital data. At least one image parameter for characterizing the digital data, such as a motion vector table or DC-luminance, is selected as an image parameter. All possible Huffman tables according to the image parameter are then generated by Huffman tree mutation. A predetermined number of active Huffman tables from all possible Huffman tables are selected using a first encryption key and a hash function. Afterward, a coding sequence for the active Huffman tables is generated using a second encryption key and the hash function. Finally, the digital data is encrypted into an encrypted bit stream by the active Huffman tables with the coding sequence. Encrypted symbols of the image parameter can be reduced by symbol statistic analysis, thus reducing computation effort.

25 Claims, 11 Drawing Sheets

METHOD AND APPARATUS FOR ENCRYPTING AND DECRYPTING DIGITAL DATA

BACKGROUND OF THE INVENTION

1. Field of the Invention

The present invention relates generally to a method and apparatus for encrypting and decrypting digital data, and more particularly to a method and apparatus for encrypting and decrypting digital data, this method processes multimedia digital data through multiple Huffman tables and encryption keys to enhance security and processing efficiency.

2. Description of the Related Art

For many years, the entertainment industry has provided audio-visual information to the general populous in the form of television programming. When transmitted in an analog format, such as National Television Systems Committee (NTSC) or Phase Alternating Line (PAL), this programming is somewhat protected due to the inherent nature of analog signaling.

Due to advances in digital processing technology and acceptance of the Internet, digital content distribution is now growing in popularity. For example, digital TV has begun to play an important role nowadays. However, inappropriate content appears more and more in TV programs without effective control from such broadcasting. Even though there exists products that can help parents protect their kids from specific channels, there is still inappropriate content that comes from so-called healthy or safe channels, or within movies whose producers don't want to cut them since they might be specifically used to attract certain audience or it might be important to show content's integrity. It will be highly desirable to have management on those inappropriate digital data such as digital TV content to kids to common channel.

Before describing prior art encryption mechanisms for multimedia digital data, it is beneficial to review the basic building blocks to process and compress multimedia digital data. FIG. 1 shows a schematic diagram of an exemplary media content provider system, wherein a content provider sends multimedia digital data, such as video, audio and image data, to a plurality of clients through wireless or wired channels. Generally, the transmission of the video content needs considerable bandwidth and therefore various standards are proposed to compress the video content. Moving Picture Experts Group (MPEG) standards are international standards for compressing and transmitting moving images and audio data, and methods of decompressing and processing the coded compressed information. The MPEG standards include MPEG-1, MPEG-2 and MPEG-4, and generally eliminate or transform duplicated information and compress moving image signals by applying statistical properties to the remaining or the transformed multimedia data.

FIG. 2 shows a simplified schematic diagram of a prior art MPEG 2 encoder 10, wherein certain elements, such as motion estimator, prediction selector, subtract unit, internal decoder and rate controller, are omitted for simplicity.

FIG. 3 is a hierarchical diagram of MPEG bit stream from a video sequence level to a block level. A video clip comprises a plurality of picture frames and several frames are allocated to group of picture (GOP) to exploit temporal redundancy. One I frame (Intra frame) out of the GOP is divided into a plurality of slices and each slice is further divided into a plurality of macro blocks (MB). The macro block is further divided into a plurality of blocks, wherein a block is the smallest coding unit in a standard video coding algorithm and is processed by the encoder 10 shown in FIG. 2.

Therefore, the input of the encoder 10 shown in FIG. 2 is an 8×8 block of pixels, which will constitute an image frame with other blocks. The 8×8 block of pixels is processed by a Discrete Cosine Transform (DCT) 100 to exploit redundancy and irrelevancy, which is important to digital image/video compression. DCT coefficients obtained through the DCT 100 are quantized and zigzag scanned to form bit sequences with highly peaked probability. The bit sequences are processed by a run-length coder 140 to account for consecutive logical zeros and then the processed result is sent to a variable length coder (VLC), such as a Huffman coder 160, for reducing overall data size. The data output by the Huffman coder 160 is a data bit stream and can be sent to a receiver with corresponding decoder capabilities to process the data bit stream in reverse order (i.e., decode it).

Traditional solutions to multimedia data confidentiality are based on scrambling techniques, which consist of relatively simple permutation and/or affine transformation operations in the time or the frequency domain. However, as the computing power increases quickly these days, low cost scrambling algorithms become vulnerable to attacks. Furthermore, scrambling of the raw signal degrades the performance of multimedia compression systems, which have been designed based on the characteristics of unscrambled signals.

More recently, the focus of multimedia security research has shifted to integrating encryption with multimedia compression systems. U.S. Published Patent Application No. 20040136566 discloses a method and apparatus for encrypting and compressing multimedia data. The disclosed method includes creating DCT coefficients by applying input multimedia data to a DCT unit, and quantizing the DCT coefficients; encrypting and compressing transformed Differential Coefficients (DC coefficient) and transformed Amplitude Coefficients (AC coefficient) by transforming encoded DC and AC coefficients depending on a certain encryption key at the time of entropy encoding quantized DC and AC coefficients of the quantized DCT coefficients. However, this method decreases compression efficiency as a result of encrypting DCT coefficients before run-length and Huffman coding.

SUMMARY

The present disclosure provides a method and apparatus for encrypting and decrypting digital data, which has enhanced security and processing efficiency. In one embodiment, provided is a method for encrypting digital data, such as MPEG-like data or JPEG data. At least one image parameter for characterizing the digital data, such as motion vector table and DC-luminance, is selected as an image parameter(s). All possible Huffman tables according to the image parameter are then generated by Huffman tree mutation. A predetermined number of active Huffman tables from all possible Huffman tables are selected using a first encryption key. Afterward, a coding sequence for the active Huffman tables is generated using a second encryption key. Finally, the digital data is encrypted into an encrypted bit stream by the active Huffman tables with the coding sequence.

According to one aspect, symbol statistic analysis can be applied to the image parameter to reduce the number of symbols to be processed. Accordingly, the amount of Huffman table pond is reduced to save computation resource.

According to another aspect, a method for decrypting the encrypted digital data is also disclosed. The decrypting method uses the same hash function as the encrypting method. The data can be decrypted only when correct keys are known.

According to still another aspect, the encrypting apparatus and decrypting apparatus according to the present invention can be used with ordinary decoder/encoder adds security to a digital system without a data encryption mechanism.

DETAILED DESCRIPTION

Hereinafter, methods and apparatus for encrypting and decrypting multimedia digital data according to preferred embodiments will be described in detail with reference to the attached drawings. The below preferred embodiments are exemplified with MPEG 2 digital data, however, the disclosed apparatus and method can also be applied to any MPEG-like format, such as MPEG-1, MPEG-2 and MPEG-4 format or JPEG format, as long as entropy coding with Huffman code is involved.

Figure 4A:
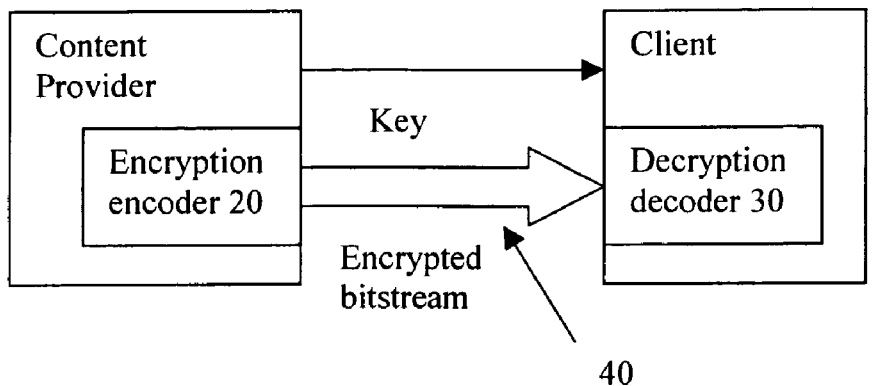
FIG. 4A shows a schematic diagram of an application according to a first preferred embodiment.

FIG. 4A shows a schematic diagram of an application according to a first preferred embodiment. The encrypting apparatus according to this embodiment can be implemented on an encryption encoder 20 for a content provider. Moreover, a decryption decoder 30 equipped with a corresponding decrypting apparatus is arranged at the client site. The digital content sent by the content provider is compressed and encrypted by the encryption encoder 20 into an encrypted bit stream. The encrypted bit stream is transmitted through a channel 40 and then decompressed and decrypted by the decryption decoder 30 at the client site.

Figure 3:
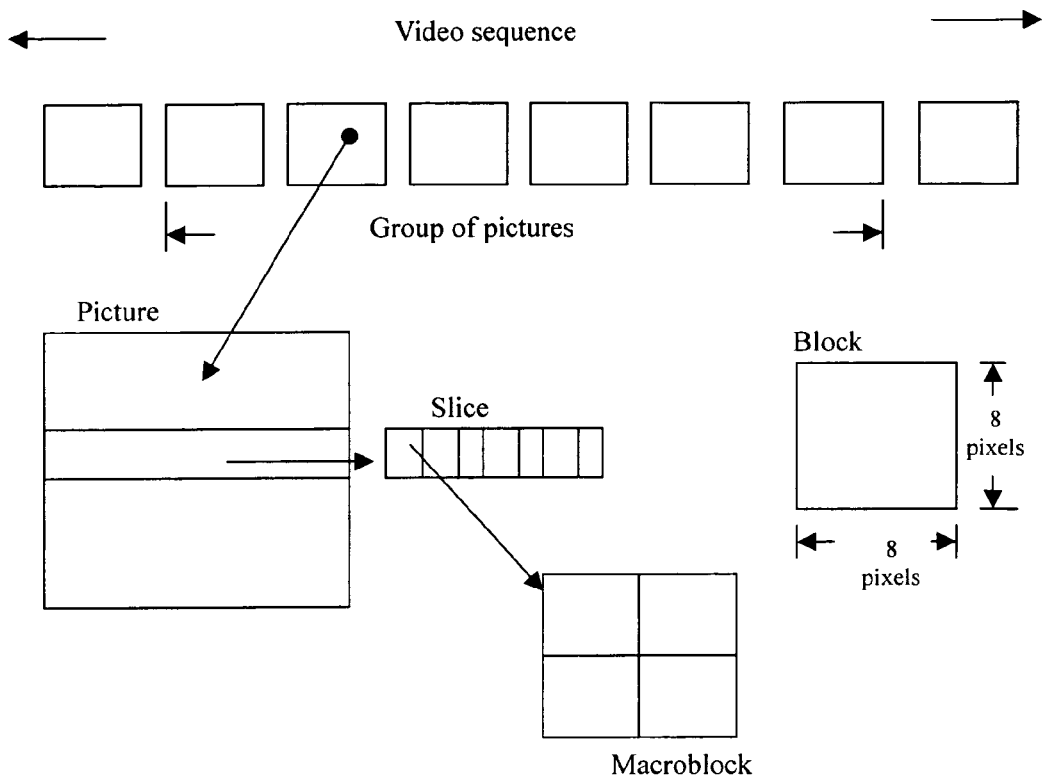
FIG. 3 is a hierarchical diagram of an MPEG bit stream from a video sequence level to a block level.
Figure 5:
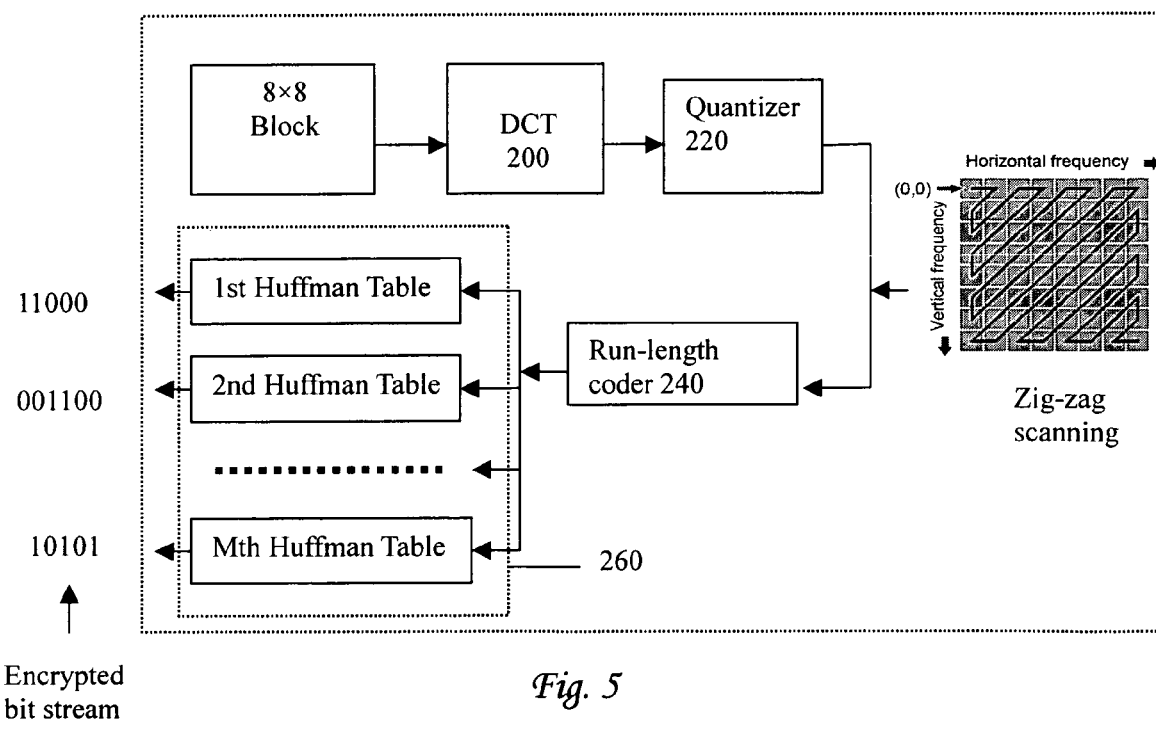
FIG. 5 shows a schematic diagram of the encoder according to the first preferred embodiment.

FIG. 5 shows a schematic diagram of the encryption encoder 20 according to the first preferred embodiment. The encryption encoder 20 comprises similar components as those shown in FIG. 3 except that an encrypting apparatus is incorporated for encrypting the data to be sent. The similar components adopt the similar numerals, and the operations for the similar components are omitted for simplicity. More particularly, the encrypting apparatus is implemented by the Huffman coder 260 of the encryption encoder 20 to encrypt a video data output from the run-length coder 240 into encrypted bit streams.

Figure 6A:
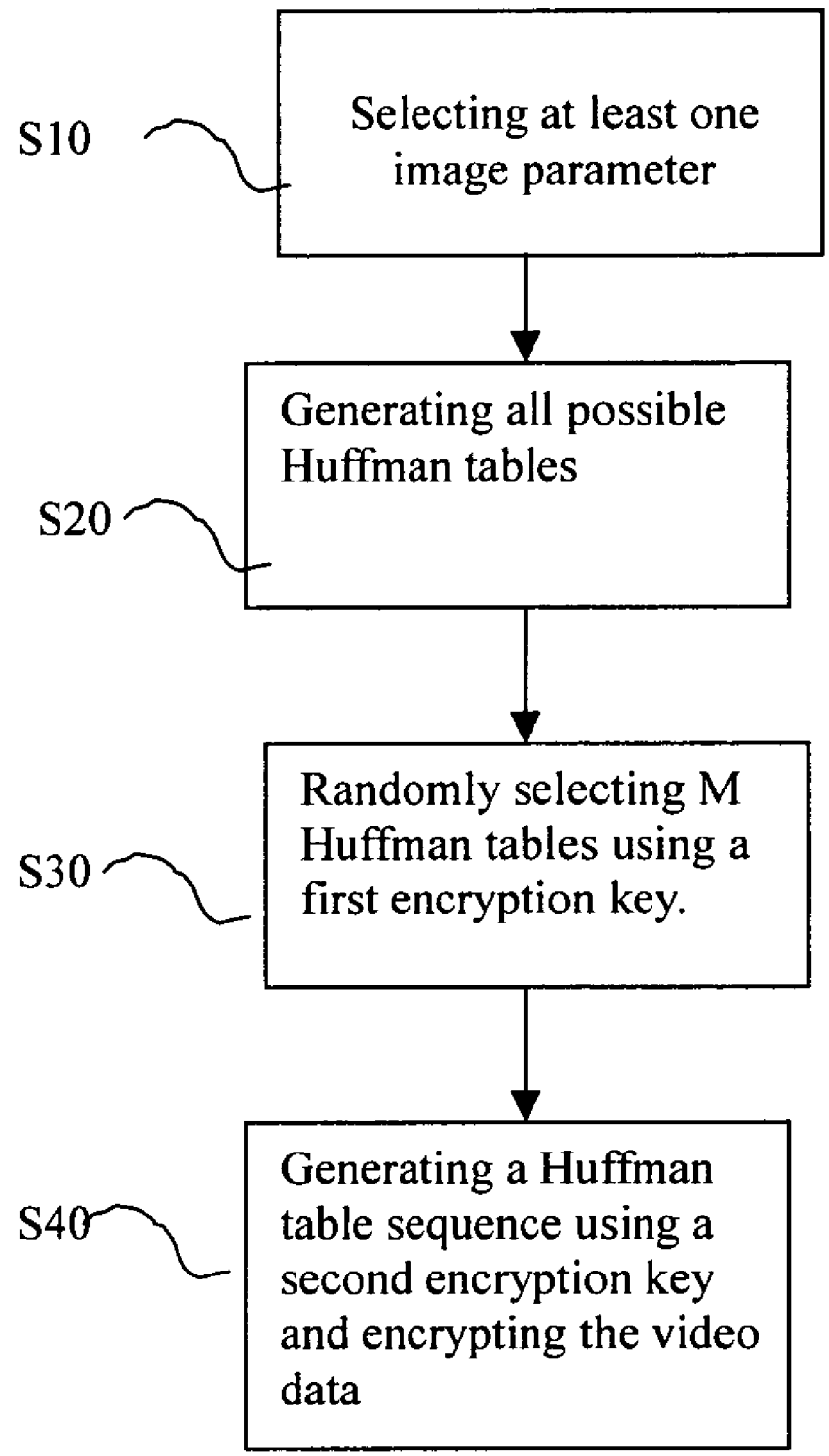
FIG. 6A is a flowchart of a method for encrypting digital data according to the first preferred embodiment.

FIG. 6A is a flowchart of a method for encrypting digital data according to the first preferred embodiment. The Huffman coder 260 of the encryption encoder 20 is operated according to the encrypting method shown in this figure. This encrypting method according to the first preferred embodiment of the present invention comprises the following steps:

S10: Selecting at least one image parameter for characterizing the video data output from the run-length coder 240.

S20: Generating all possible Huffman tables according to the selected image parameter.

S30: Randomly selecting M Huffman tables as active Huffman tables from all possible Huffman tables using a first encryption key.

S40: Generating a Huffman table sequence using a second encryption key and encrypting the symbols of the video data by the active Huffman tables in the order determined by the Huffman table sequence.

According to ISO_IEC__13818, the Huffman coder 260 is used to process image parameters, including MB address increase table, MB type table (I/P/B), coded block pattern table, motion vector table, DC-luminance, DC-chrominance table, and AC coefficient table. Hereinafter, the DC-luminance and the motion vector table are used to demonstrate the present invention. Therefore, in step S10 of the encrypting method, the DC-luminance is selected as the image parameter for encrypting the video data.

Figure 9:
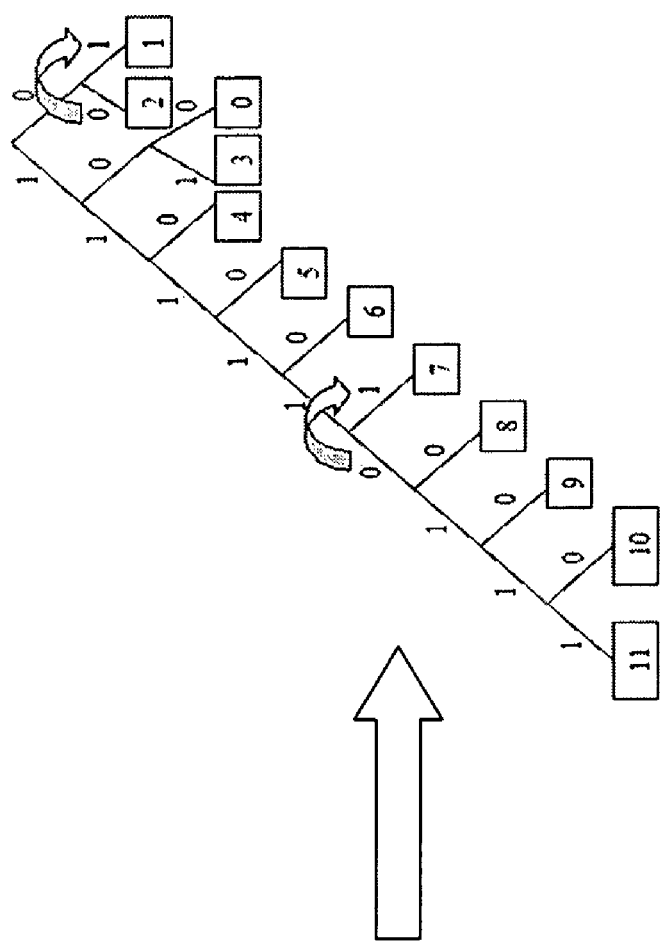
FIG. 9 shows the Huffman tree mutation for DC-luminance parameter.
Figure 9:
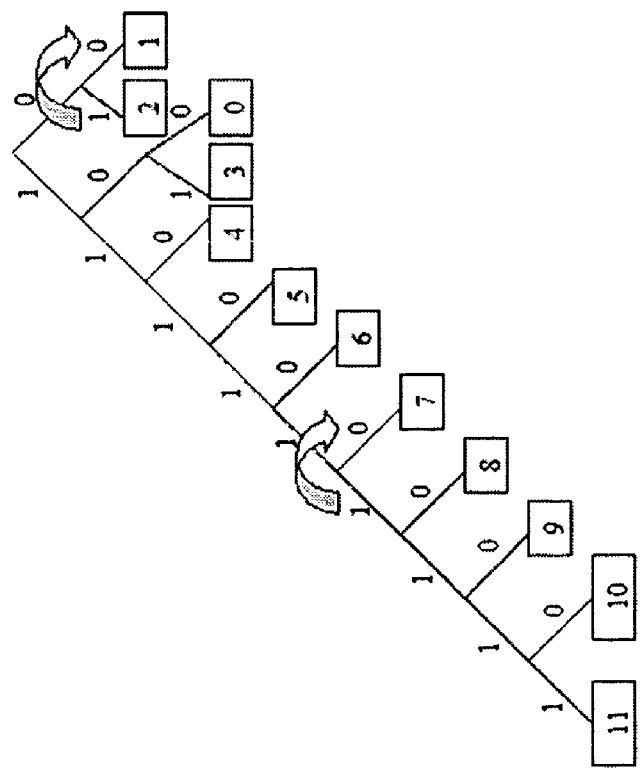

In step S20, all possible Huffman tables are generated according to the selected image parameter, namely, the DC-luminance of the video data. The possible Huffman tables can be generated, for example, by Huffman tree mutation. FIG. 9 shows one Huffman tree mutation operation for the DC-luminance. Generally, for a Huffman table with t entries, every node other than leaf node (the node associated with number box) has exactly two children in the Huffman tree thereof. The Huffman tree has t leaf nodes and (t−1) inner nodes and label pairs, which provides the choice to make (t−1) decisions about whether to permute the inner node or not. Therefore, $2^{(t-1)}$ Huffman trees could be generated in this case. As shown in FIG. 9, the standard DC luminance Huffman table has 12 entries, thus 11 inner nodes; therefore $2^{11}$=2048 different Huffman tables can be generated in step S20 of the encrypting method according to the first preferred embodiment.

In the above-mentioned preferred embodiment, only the label pair of certain leaf node is permuted without the length change to access that symbol. Therefore, the final size is the same. Originally, symbol 2's VLC code is 01 and symbol 7's VLC code is 111110 with standard DC luminance Huffman table. With reference to the new Huffman table in right part of FIG. 9, 2's VLC code becomes 00 and symbol 7's VLC code is 111111, the code length is still the same. Thus, using multiple Huffman table (MHT) to encrypt the video data will not change the file size.

Figure 7A:
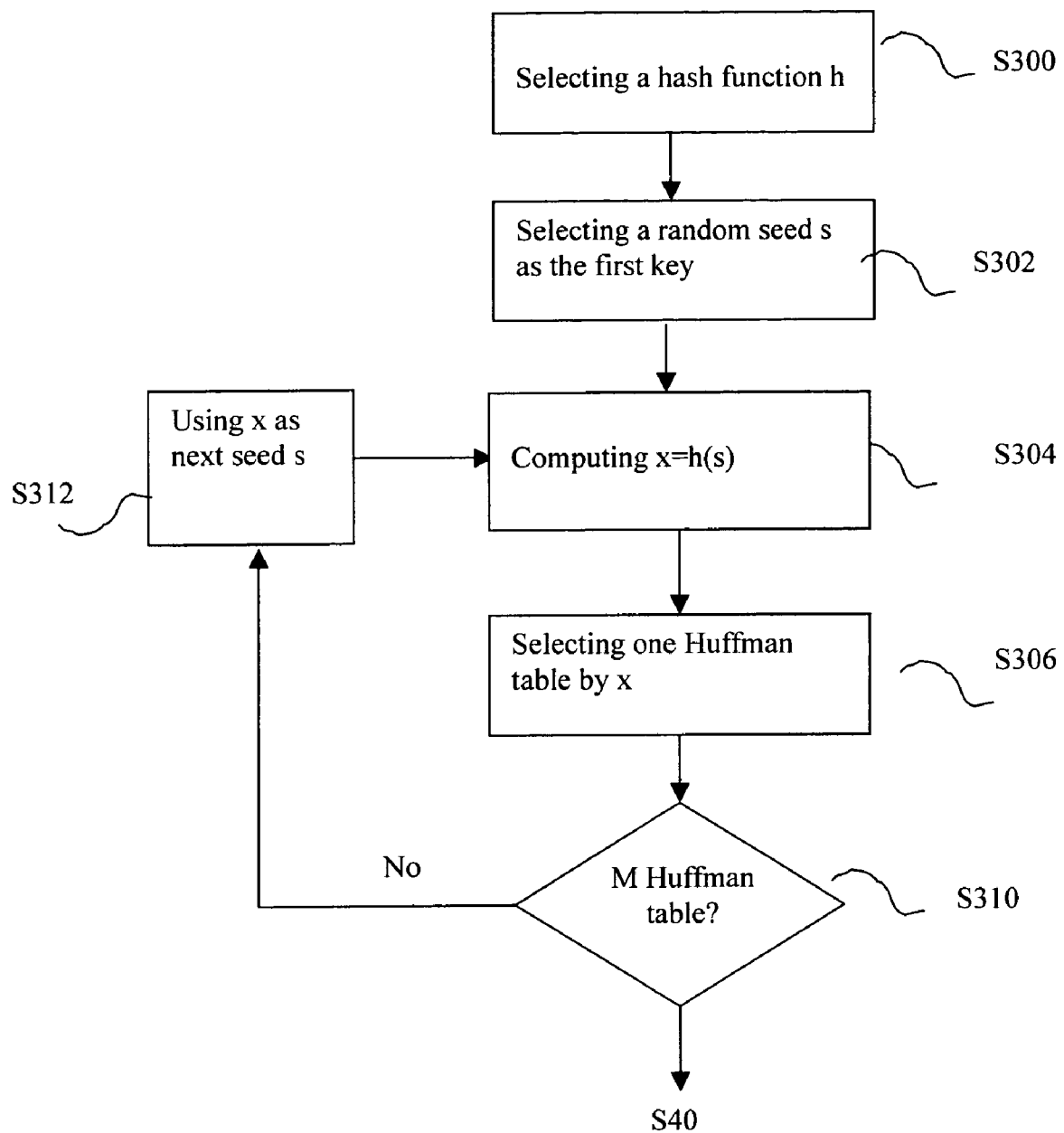
FIG. 7A is a flowchart of selecting active Huffman tables.

In step S30, a predetermined number of Huffman tables, such as M Huffman tables (hereinafter, the selected M Huffman tables are referred to as active Huffman tables), are randomly selected out of all possible Huffman tables using a first encryption key. With reference to FIG. 7A, step S30 comprises the following steps. In step S300, a cryptographically hash function h, such as PJW Hash function, is selected. In step S302, a random seed s used as the first encryption key is selected; in step S304, a function value x=h(s) is computed. In step S306, a Huffman table is selected out of the Huffman table pond based on the function value x. More particularly, the Huffman table can be selected by computing x mod total number of Huffman table pond. If the function value x computed by the hash function is 9000 and the total number of the Huffman table pond is 2048, the 808th (9000 mod 2048) Huffman table is selected in step S306. Step S310 examines whether M Huffman tables have been selected. If false, the function value x, namely, 9000 in the above case, is used as new seed s for the hash function in step S312 and the procedure goes back to step S304 for computing the next function value. Otherwise, the procedure is ended with M Huffman tables selected.

Figure 7B:
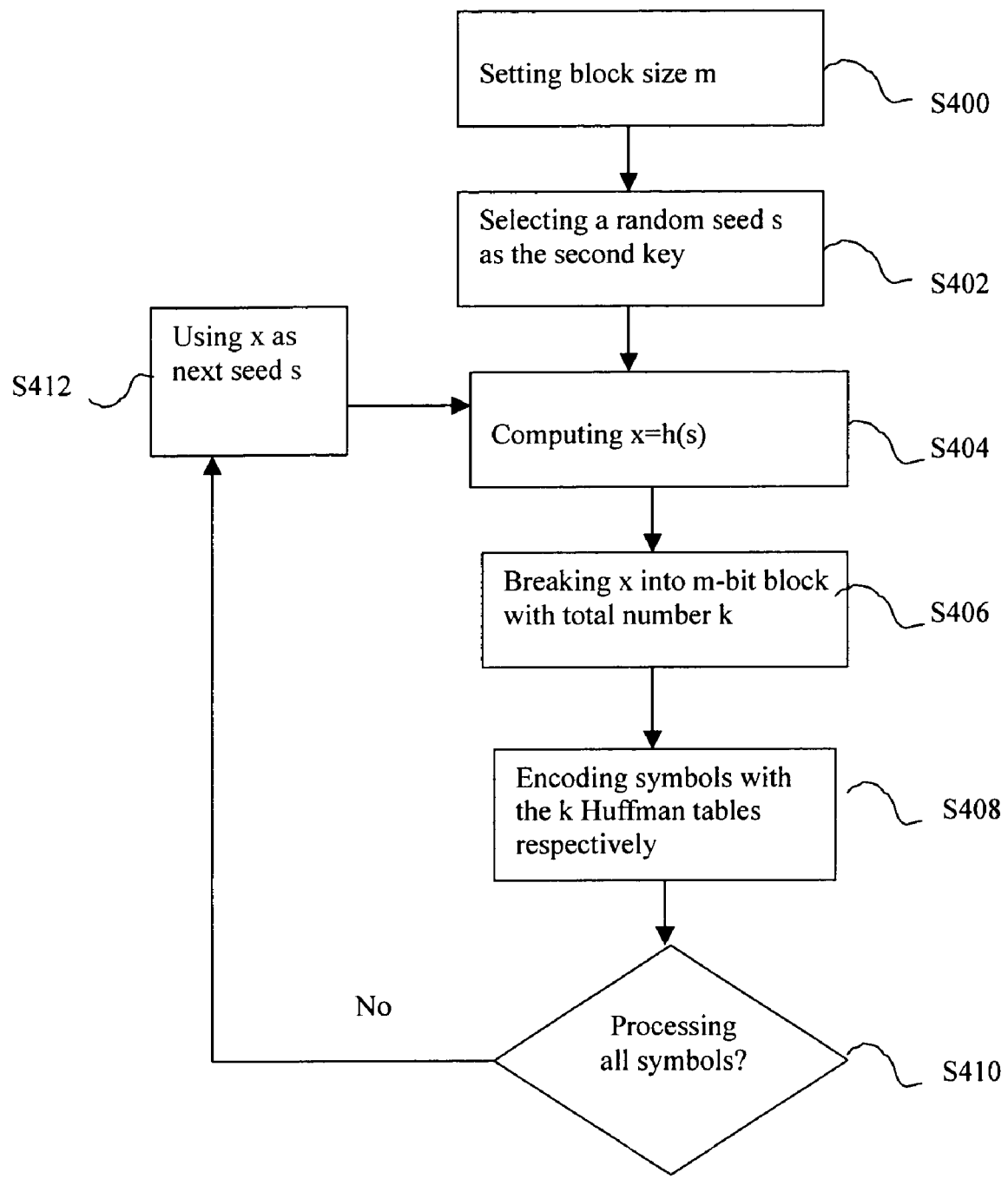
FIG. 7B is a flowchart of setting table sequence of the selected active Huffman tables.

In step S40, the digital content is encrypted by randomly and sequentially selecting one Huffman table from the M Huffman tables. With reference to FIG. 7B, step S40 comprises the following sub-steps. In step S400, a block size 'm' is selected corresponding to the total number M of the selected active Huffman tables, where $M=2^m$. In step S402, a random seed s used as the second encryption key is selected, and in step S404, a function value $x=h(s)$ is computed. In step S406, a plurality of Huffman tables are randomly selected according to the function value x. More particularly, the function value x is broken to m-bit blocks with reference to the expression $x=t_1\|t_2\| \ldots \|t_k\|$rem, with each $t_i$ representing a number from 0 to M−1 and rem denotes the remaining bits. For example, if M is 8 and therefore m is 3, a function value x of 500 has binary value of 1111101000 and is broken into 111∥110∥100∥10. Therefore, the 7th, 6th and 4th Huffman tables are selected for sequentially encrypting the symbols in step S408. Step S410 checks whether all symbols have been processed. If not, step S412 is executed to set the function value x as a new seed and the procedure goes back to step S404 again to compute the function value of the hash function. Otherwise, the procedure is ended with all symbols having been processed.

Figure 6B:
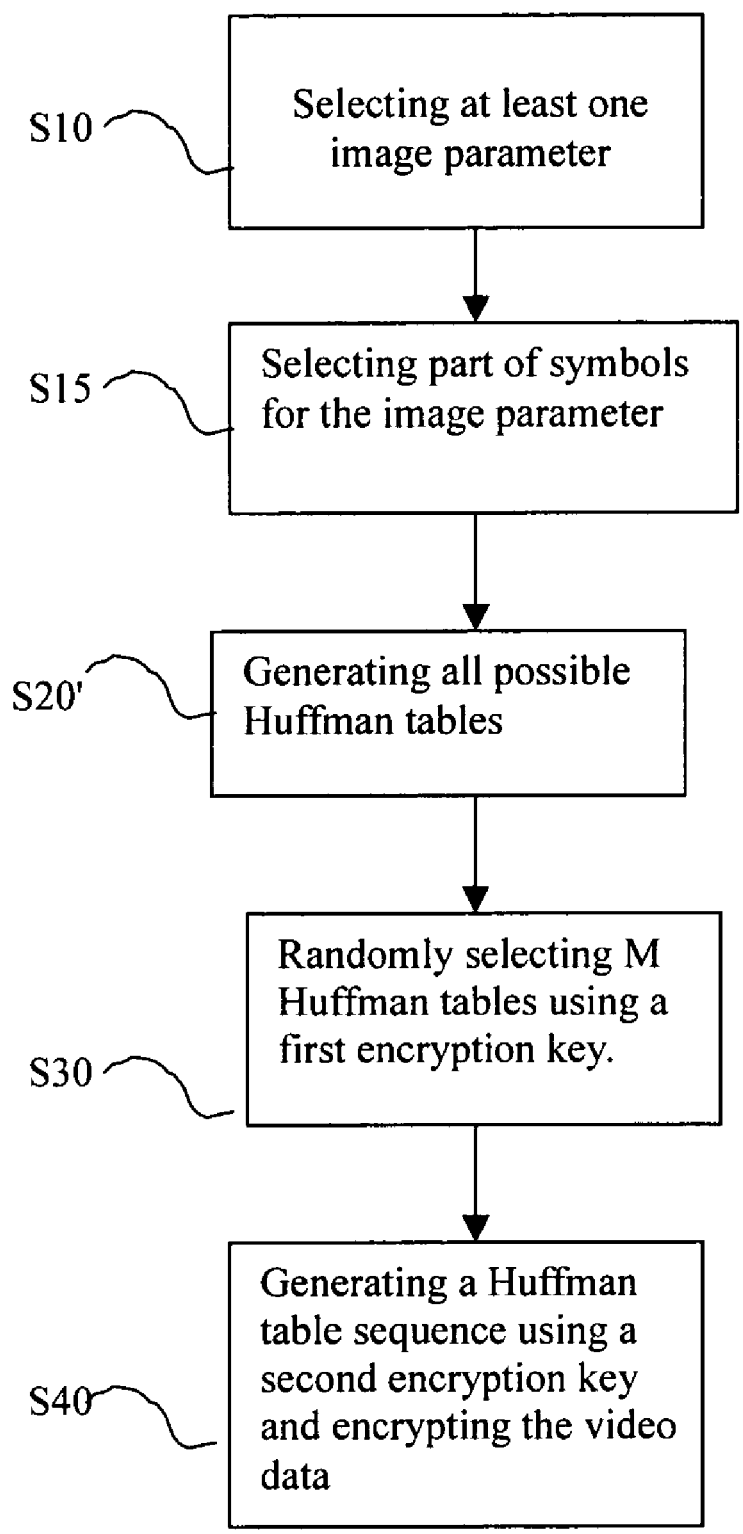
FIG. 6B is a flowchart of a method for encrypting digital data according to the second preferred embodiment.

FIG. 6B shows a flowchart of a method for encrypting digital data according to another preferred embodiment. The Huffman coder 260 of the encryption encoder 20 is operated according to this encrypting method, as shown in FIG. 6B. In this preferred embodiment, the computation effort is advantageously reduced by applying symbol statistic analysis to the image parameter. Therefore, the number of symbols to be processed is reduced. This encrypting method according to the second preferred embodiment comprises the following steps:

S10: Selecting at least one image parameter for characterizing the video data output from the run-length coder 240, wherein the image parameter contains a first number of symbols. With reference to FIG. 9, for the DC-luminance parameter, the symbol number is 12. Therefore, the first number is 12 when the selected image parameter is DC-luminance in step S10.

Figure 10B:
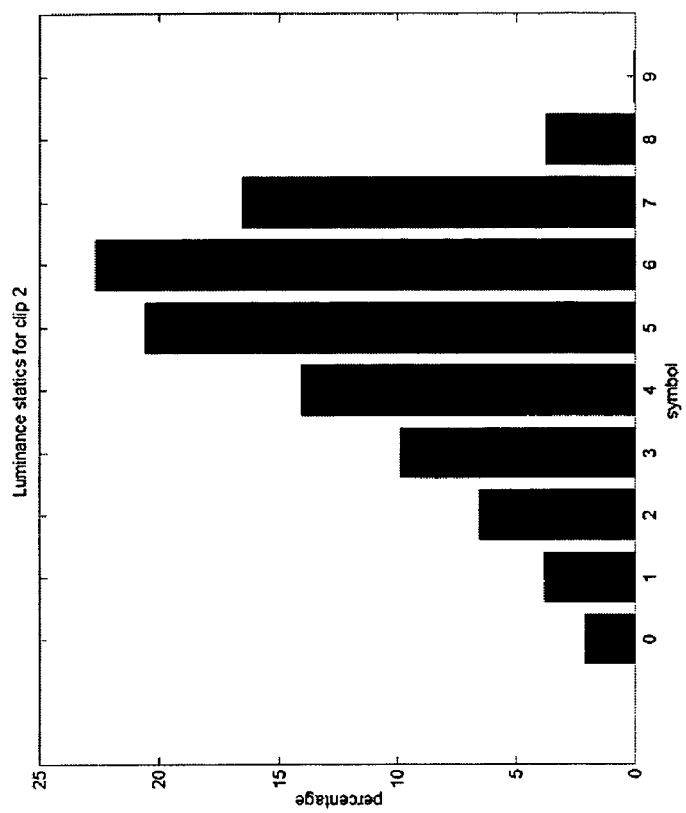
FIG. 10A and 10B show the symbol statistic analysis of DC-luminance for two clips.
Figure 10A:
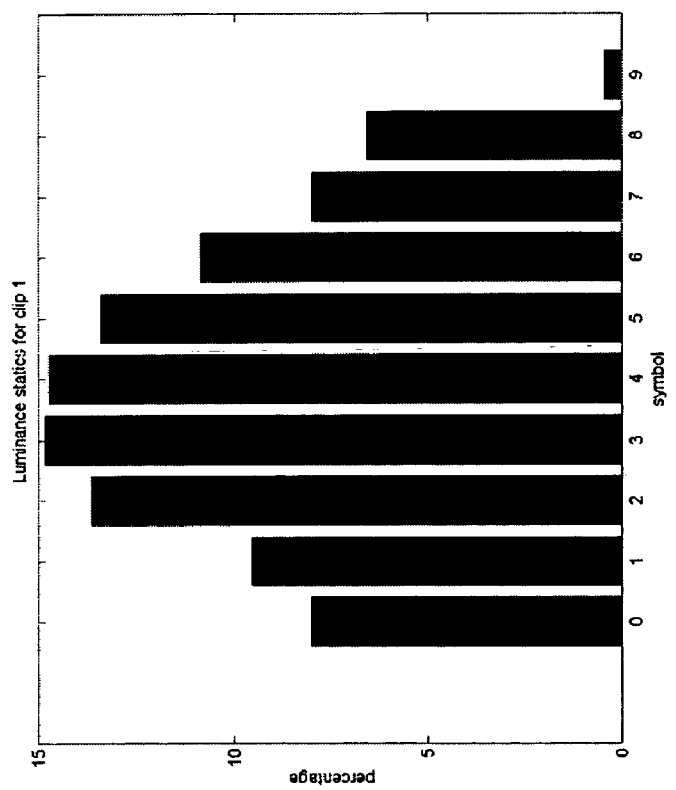

S15: Selecting a second number of symbols from the image parameter based on a symbol statistic analysis of the image parameter, wherein the second number is less than the first number. With reference to FIG. 10A, for the DC-luminance parameter, the number of dominant symbols is 9. These 9 symbols are the most frequently present in the DC-luminance parameter. Therefore, the second number is 9 when the selected image parameter is DC-luminance in step S10.

S20': Generating all possible Huffman tables according to the selected symbols.

S30: Randomly selecting M Huffman tables as active Huffman tables from all possible Huffman tables using a first encryption key.

S40: Generating a Huffman table sequence using a second encryption key and encrypting the symbols of the video data by the active Huffman tables in the order determined by the Huffman table sequence.

The encrypting method according to the second preferred embodiment has similar steps with the encrypting method according to the first preferred embodiment. Therefore, similar numerals for those steps are used and description is made only to the different steps S15 and S20'.

In step S15, only partial symbols of the DC-luminance are selected based on symbol statistic analysis to prevent excessive computation. FIG. 10A and 10B show the symbol statistic analysis of the DC-luminance parameter for two clips (clip 1 and clip 2), wherein the DC-luminance parameter has 12 symbols. Those symbols covering a dominant probability in the total symbols of the image parameter are selected in step S15. As can be seen from those figures, symbols [0-8] cover more than 90% in the total symbols. Therefore, the symbols [0-8] are selected to generate the Huffman table pond instead of using all symbols [0-11]. The computation effort can be saved and the encrypting method can be implemented on portable electronic equipment with limited resources. In step S20', all possible Huffman tables are generated according to the selected symbols. Therefore, there are $2^9=512$ possible Huffman tables in this preferred embodiment.

Figure 11B:
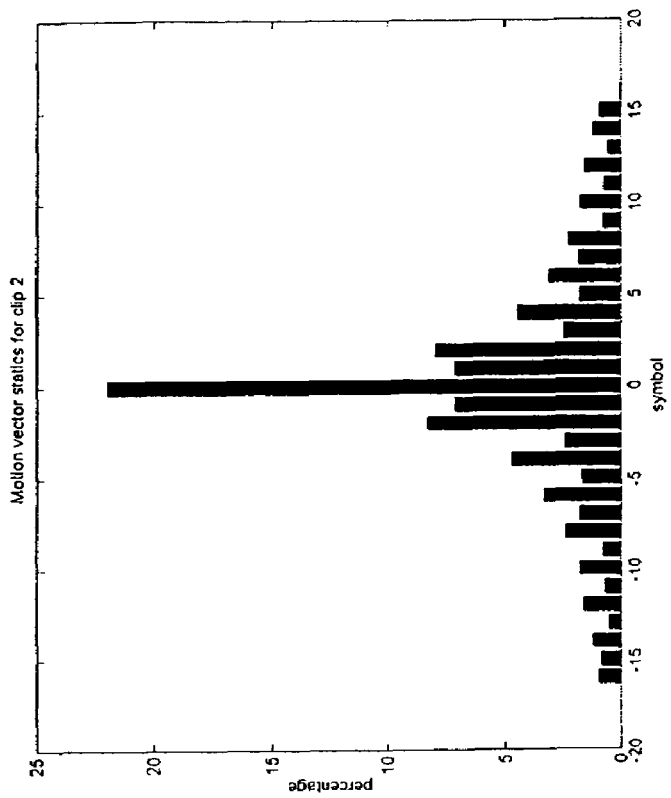
FIG. 11A and 11B show the symbol statistic analysis of motion vector for two clips.
Figure 11A:
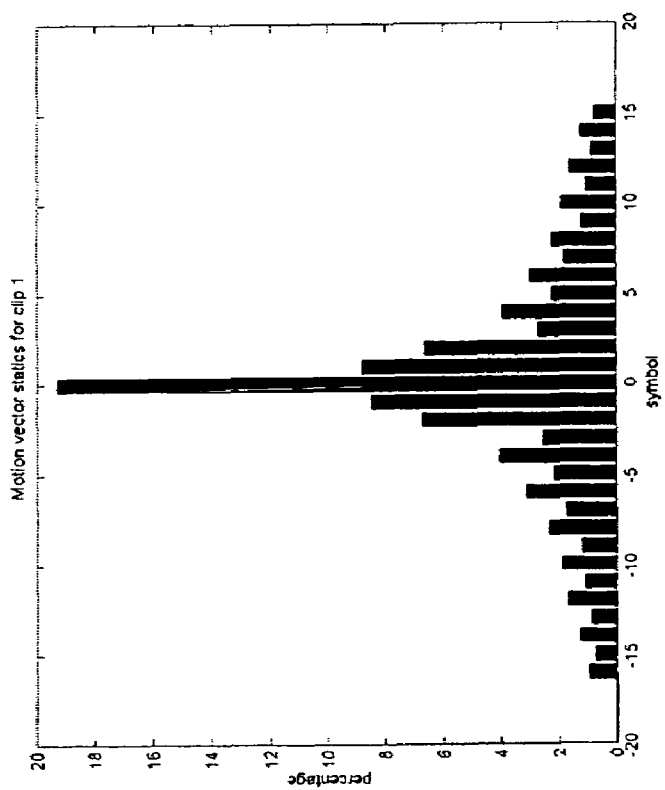

Moreover, FIGS. 11A and 11B show the symbol statistic analysis of the motion vector parameter for two clips (clip 1 and clip 2). As can be seen from those figures, most of the symbols of the motion vector parameter are present in the range [−8, 8]. Therefore, the symbol statistic analysis can also be advantageously applied to the motion vector parameter.

The effectiveness of the symbol statistic analysis is described below. For DC-luminance with 12 symbols, the encoder for DC-luminance has 2048 Huffman tables, each Huffman table has 12 entries, each entry occupying 3 Bytes, thus needing a total of 2048*12*3 Bytes=73,728 Bytes at the encoder end. For the decoder, everything is the same except table size. The table size depends on the longest length of the VLC code. The longest length of DC luminance is 9, thus the table size in the decoder end is $2^9=512$ entries. The memory accounted for DC luminance at the decoder end is 2048*512*3 Bytes=3,145,728 Bytes, which is too large on just one Huffman coding table. According to step S15 of the second preferred embodiment, only 9 symbols of the DC-luminance, i.e., symbols [0-8], are used for generating possible Huffman tables. The second preferred embodiment fixes the inner nodes whose left nodes are 9, 10 & 11; thereafter, the memory usage at the encoder end decreases to 512*12*3 Bytes=18,432 Bytes, while the memory usage at the decoder end decrease to 512*512*3 Bytes=786,432 Bytes, which is acceptable practically.

As can be seen from the above description, the security of the encrypted digital content can be enhanced because the active Huffman tables are selected randomly by hash function with the first encryption key, and the coding Huffman table sequence of the active Huffman tables is also determined by hash function with the second encryption key. The effectiveness of the disclosed encrypting method(s) can be evaluated based on the above example. One goals is to provide real-time property. A hacker would find it very hard to decrypt the encrypted bit stream without the correct keys, as long as the key space is large.

As explained earlier, a Huffman coding table with t entries can be permutated to get $2^{(t-1)}$ different tables, from which M tables are chosen, so the number of different ways to make the choice is $C_M^{2^{(t-1)}}$. The number in the key sequence used to choose from M Huffman tables is independent of each other. Without the correct key, every symbol the hacker needs to try M Huffman tables. Provided that there are L symbols encoded into the ciphertext, the size of the key space is:

size(keyspace)=$C_M^{2^{(r-1)}} \times M^L$.

Using DC luminance as an example to denote the key space, there are is a total of 512 Huffman permutation tree. Provided that 4 Huffman tables are selected as active Huffman tables from the 512 Huffman permutation tree, and L is 128, the size of key space is:

Size of the key space of luminance=$C_4^{512} \times 4^{128}$=3.2768×$10^{86}$

Size of the key space of motion vector=$C_4^{512} \times 4^{128}$=3.2768×$10^{86}$ Total size of the key space=key space of luminance×key space of motion vector=$(3.2768 \times 10^{86})^2$.

Normally, a video clip's encoded symbol is much larger than 128; thus, it is practically impossible to perform brute-force search in a key space of this size. Therefore, the data encrypting method according to the first and the second preferred embodiments has excellent security.

Figure 8:
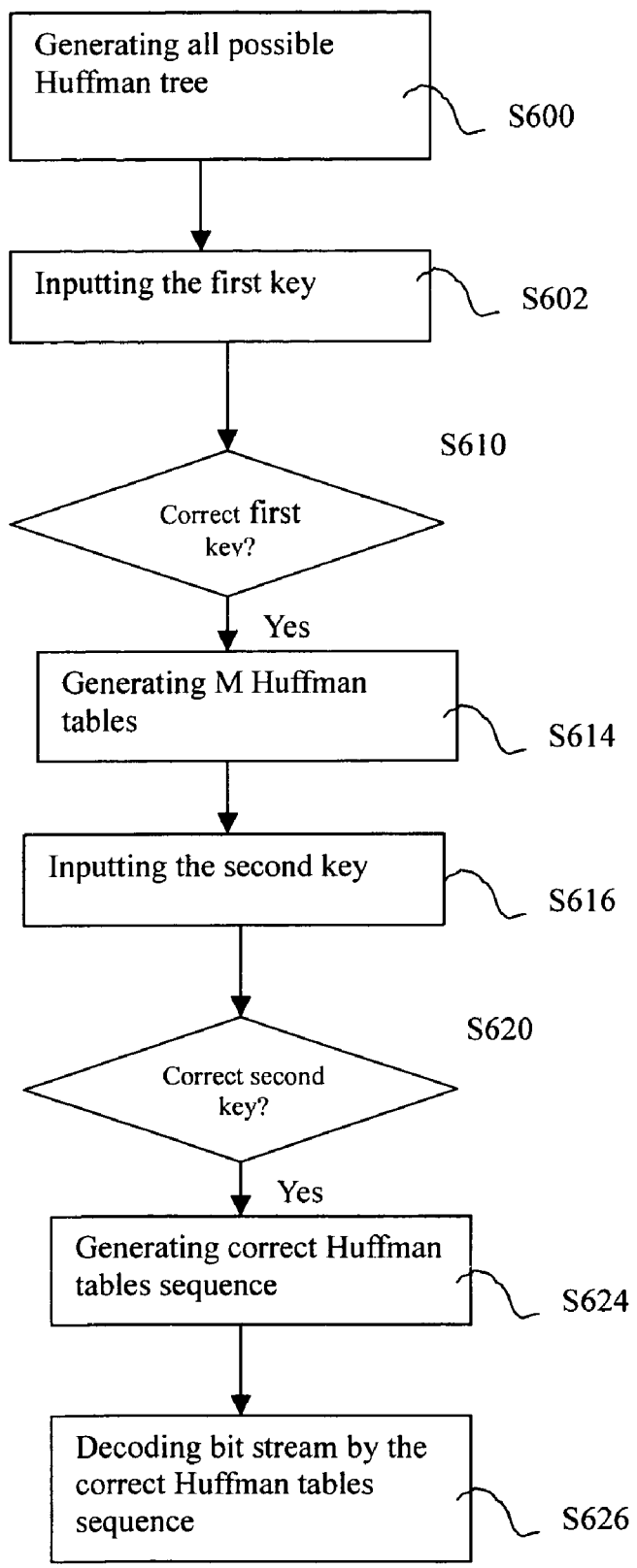
FIG. 8 is a flowchart of a method for decrypting digital data according to still another preferred embodiment.

As shown in FIG. 4A, a decryption decoder 30 with a decrypting method according to the disclosed principles is provided at a client end and used to decrypt the encrypted bit stream sent from the encryption encoder 20 through the channel 40, provided that a correct first encryption key and a correct second encryption key are used. FIG. 8 shows a flowchart of the decrypting method according to such a preferred embodiment. Before decrypting the encrypted digital content, the decryption decoder 30 has priori information about the selected image parameter, such as DC luminance, and the two encryption keys, namely, the first encryption key and the second encryption key. Moreover, the information of the selected image parameter and the two encryption keys can also be sent to the decryption decoder 30 through a secured channel.

As shown in FIG. 8, in step S600, all possible Huffman tables are generated based on the selected image parameter, such as DC luminance. In step S602, a first input key is input, and step S610 judges whether the first input key is correct, namely, matched with the first encryption key. Step S614 is executed when the first input key is correct. Step S614 generates the active Huffman tables (the M Huffman tables) based on the same hash function as that in the encryption encoder 20 and the correct first encryption key. Afterward, a second input key is input in step S616, and step S620 judges whether the second input key is correct, namely, matched with the second encryption key. Step S624 is executed when the second input key is correct. In step S624, the correct Huffman table sequence for decrypting the encrypted bit stream sent from the encryption encoder 20 is generated based on the same hash function as that in the encryption encoder 20 and the correct second encryption key. Finally, in step S626, the encrypted bit stream is decrypted by the active Huffman tables arranged in the table sequence determined in step S624. As can be seen from the flowchart in this figure, the encrypted digital content can be correctly played back only when both the first input key and the second input key are correct.

The above-mentioned decrypting method shown in FIG. 8 corresponds to the encrypting method of the first preferred embodiment. The decrypting method can be adapted to decrypt the encrypted bit streams generated by the encrypting method of the second preferred embodiment. In this case, the decryption decoder 30 also has priori information about the symbol statistic analysis for the selected image parameter, besides the selected image parameter and the encryption keys. In step S600, all possible Huffman tables are generated based on the known symbol statistic analysis, besides the selected image parameter.

Figure 1:
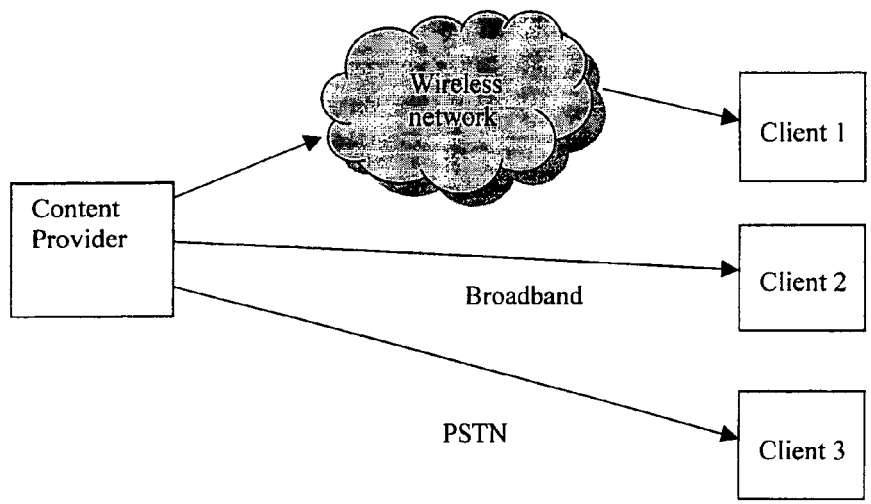
FIG. 1 shows a schematic diagram of an exemplary media content provider system.
Figure 2:
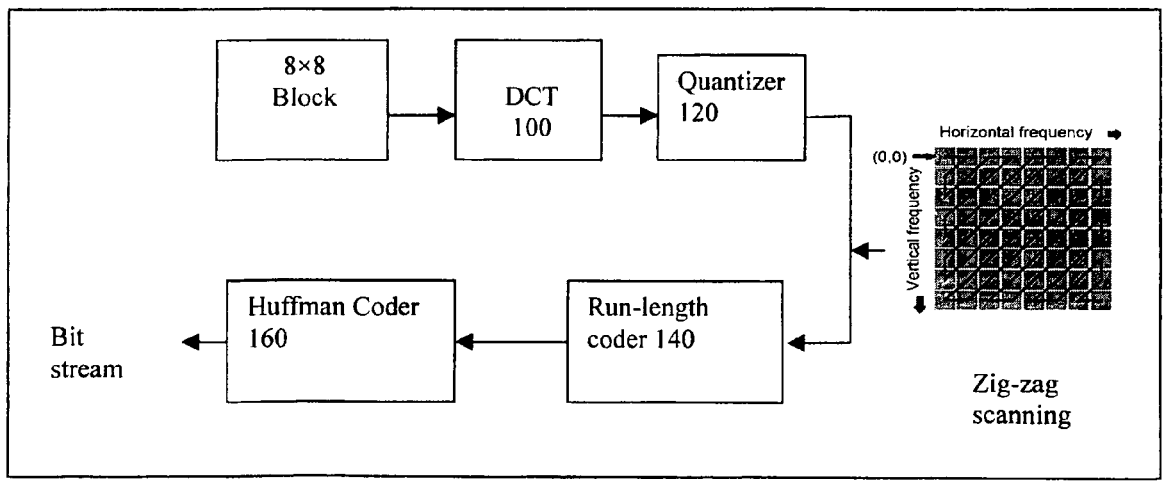
FIG. 2 shows a simplified schematic diagram of a prior art MPEG 2 encoder.
Figure 4B:
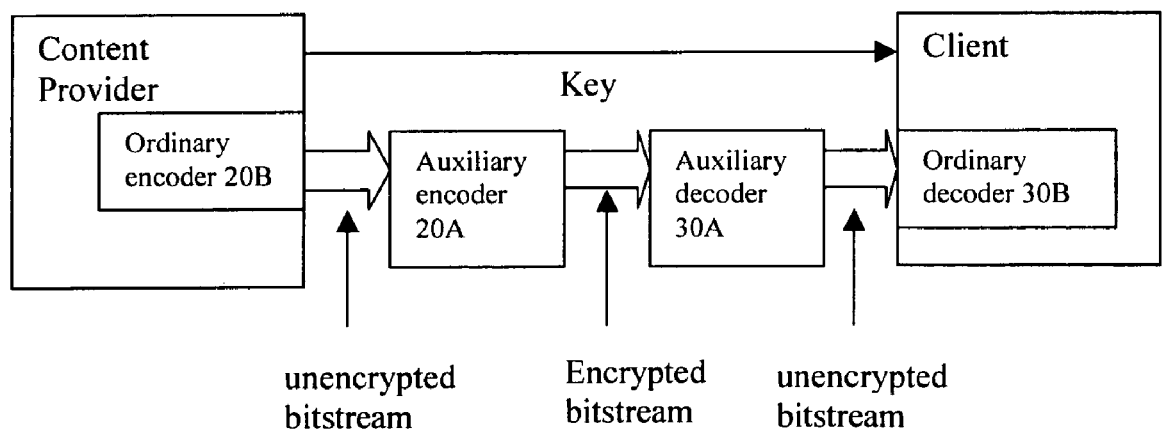
FIG. 4B shows a schematic diagram of an application according to a second preferred embodiment.

FIG. 4B shows a schematic diagram of an application according to another preferred embodiment. In this preferred embodiment, an auxiliary encoder 20A and an auxiliary decoder 30A are applied to a digital system without encryption/decryption ability. In the digital system, the content provider site has an original encoder 20B, which converts multimedia data to a non-encrypted bit stream and is, for example, the MPEG2 encoder 10 shown in FIG. 2. The client site has an ordinary decoder 30B, which decodes the non-encrypted bit stream to the multimedia data for playback. The auxiliary encoder 20A and the auxiliary decoder 30A can be applied to a digital system wherein an ordinary encoder at the content provider site and an original decoder at the client site do not have encryption/decryption ability or sufficient encryption/decryption ability.

The auxiliary encoder 20A preferably comprises the encryption encoder 20 shown in FIG. 4A and a built-in decoder (not shown). The built-in decoder first decodes the bit stream sent from the ordinary encoder 20B at the content provider site into digital media data. Afterward, the encryption encoder 20 in the auxiliary encoder 20A encrypts the digital media data into an encrypted bit stream.

Similarly, the auxiliary decoder 30A preferably comprises the decryption decoder 30 as shown in FIG. 4A and a built-in encoder (not shown). The decryption decoder 30 of the auxiliary decoder 30A first decodes the encrypted bit stream sent from the auxiliary encoder 20A into digital media data, and the built-in encoder encodes the decrypted digital media data into non-encrypted bit stream, which can be accessed by the ordinary decoder 30B at the client site. Therefore, only the client equipped with the auxiliary decoder 30A can decrypt and playback the encrypted bit stream sent from the auxiliary encoder 20A. The auxiliary encoder 20A and the auxiliary decoder 30A do not need to be integrated into hardware at the content provider site and the client site. The apparatus for encrypting and decrypting digital data according to this preferred embodiment can be advantageously augmented into a digital system without a safety mechanism. This preferred embodiment can enhance the security of the information transmission without unduly increasing hardware cost.

To sum up, the method and apparatus for encrypting and decrypting digital data according to the present invention can enhance the security of the transmitted digital data by using multiple Huffman table and hash function. The computation effort can be further reduced by conducting symbol statistic analysis over an image parameter, such as DC-luminance.

While various embodiments of the disclosed principles have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A computer-useable medium having computer-readable program code executable to implement a method for encrypting digital data, the method comprising:
   selecting at least one image parameter for characterizing the digital data, the image parameter containing a first number of symbols;
   selecting a second number of symbols from the image parameter based on a symbol statistic analysis of the image parameter, wherein the second number is less than the first number;
   generating all possible Huffman tables according to the selected symbols;
   randomly selecting a predetermined number of active Huffman tables from all possible Huffman tables using a first encryption key;
   generating a coding sequence for the active Huffman tables using a second encryption key; and
   encrypting the digital data into an encrypted bit stream by the active Huffman tables with the coding sequence.

2. The computer-useable medium according to claim 1, wherein the digital data is MPEG data including MPEG-1, MPEG-2 and MPEG-4 data.

3. The computer-useable medium according to claim 1, wherein the digital data is JPEG data.

4. The computer-useable medium according to claim 2, wherein the image parameter is at least one of MB address increase table, MB type table (I/P/B), coded block pattern table, motion vector table, DC-luminance, DC-chrominance table, and AC coefficient table.

5. The computer-useable medium according to claim 1, wherein the selected symbols cover a dominant probability in the total symbols of the image parameter.

6. The computer-useable medium according to claim 1, wherein the active Huffman tables are selected with a hash function and the first encryption key is used as a seed of the hash function.

7. The computer-useable medium according to claim 6, wherein the hash function is a PJW Hash function.

8. The computer-useable medium according to claim 1, wherein the coding sequence for the active Huffman tables is determined with a hash function and the second encryption key is used as a seed of the hash function.

9. The computer-useable medium according to claim 8, wherein the hash function is a PJW Hash function.

10. A computer-useable medium having computer-readable program code executable to implement a method for decrypting the encrypted bit stream in claim 1, the method comprising:
    generating all possible Huffman tables based on the selected image parameter and the symbol statistic analysis of the image parameter;
    receiving a first input key;
    generating the predetermined number of active Huffman tables from all possible Huffman tables using the first key when the first input key is matched with the first encryption key;
    receiving a second input key;
    generating the coding sequence for the active Huffman tables using the second input key when second input key is matched with the second encryption key; and
    decrypting the encrypted bit stream with the active Huffman tables arranged in the coding sequence.

11. A computer-useable medium having computer-readable program code executable to implement a method for encrypting digital data, the method comprising:
    selecting at least one image parameter for characterizing the digital data;
    generating all possible Huffman tables according to the image parameter;
    randomly selecting a predetermined number of active Huffman tables from all possible Huffman tables using a first encryption key;
    generating a coding sequence for the active Huffman tables using a second encryption key; and
    encrypting the digital data into an encrypted bit stream by the active Huffman tables with the coding sequence.

12. The computer-useable medium according to claim 11, wherein the digital data is MPEG data including MPEG-1, MPEG-2 and MPEG-4 data.

13. The computer-useable medium according to claim 11, wherein the digital data is JPEG data.

14. The computer-useable medium according to claim 12, wherein the image parameter is at least one of MB address increase table, MB type table (I/P/B), coded block pattern table, motion vector table, DC-luminance, DC-chrominance table, and AC coefficient table.

15. The computer-useable medium according to claim 11, wherein the active Huffman tables are selected with a hash function and the first encryption key is used as a seed of the hash function.

16. The computer-useable medium according to claim 15, wherein the hash function is a PJW Hash function.

17. The computer-useable medium according to claim 11, wherein the coding sequence for the active Huffman tables is determined with a hash function and the second encryption key is used as a seed of the hash function.

18. The computer-useable medium according to claim 17, wherein the hash function is a PJW Hash function.

19. A computer-useable medium having computer-readable program code executable to implement a method for decrypting the encrypted bit stream in claim 11, the method comprising:
    generating all possible Huffman tables based on the selected image parameter;
    receiving a first input key;
    generating the predetermined number of active Huffman tables from all possible Huffman tables using the first key when the first input key is matched with the first encryption key;
    receiving a second input key;
    generating the coding sequence for the active Huffman tables using the second input key when second input key is matched with the second encryption key; and
    decrypting the encrypted bit stream with the active Huffman tables arranged in the coding sequence.

20. An encoding system for encoding digital data, the encoding system comprising:

a network-connected computer configured to provide digital data via digital bit streams to a client computer;

an encryption encoder associated with the network-connected computer for encrypting the digital data, the encryption encoder being a computer program product comprising a computer-useable medium having computer-readable program code executable to implement a method for encrypting the digital data, the method comprising:

selecting at least one image parameter for characterizing the digital data, the image parameter containing a first number of symbols;

selecting a second number of symbols from the image parameter based on a symbol statistic analysis of the image parameter, wherein the second number is less than the first number;

generating all possible Huffman tables according to the selected symbols;

randomly selecting a predetermined number of active Huffman tables from all possible Huffman tables using a first encryption key;

generating a coding sequence for the active Huffman tables using a second encryption key; and encrypting the digital data into an encrypted bit stream by the active Huffman tables with the coding sequence; and wherein the network-connected computer is further configured to transmit the encrypted bit stream to the client computer.

21. The encoding system according to claim 20, further comprising a non-encrypting decoder associated with the encryption encoder and configured to receive media data from a content providing computer, wherein the non-encrypting decoder decodes the media data from the content providing computer into the digital data and the encryption encoder encodes the digital data into the encrypted bit stream.

22. A decrypting system for decoding the encrypted bit stream in claim 20, the decrypting system comprising:

a client computer configured to receive the encrypted bit stream from the network-connected computer; and a decryption decoder associated with the client computer for decrypting the encrypted bit stream, the decryption decoder being a computer program product comprising a computer-useable medium having computer-readable program code executable to implement a method for decrypting the encrypted bit stream, the method comprising:

generating all possible Huffman tables based on the selected image parameter and the symbol statistic analysis of the image parameter;

generating the predetermined number of active Huffman tables from all possible Huffman tables using a first input key when the first input key is matched with a first encryption key;

generating the coding sequence for the active Huffman tables using a second input key when second input key is matched with a second encryption key; and decrypting the encrypted bit stream with the active Huffman tables arranged in the coding sequence.

23. An encoding system for encoding digital data, the encoding system comprising:

a network-connected computer configured to provide digital data via digital bit streams to a client computer;

an encryption encoder associated with the network-connected computer for encrypting the digital data, the encryption encoder being a computer program product comprising a computer-useable medium having computer-readable program code executable to implement a method for encrypting the digital data, the method comprising:

selecting at least one image parameter for characterizing the digital data;

generating all possible Huffman tables according to the image parameter;

randomly selecting a predetermined number of active Huffman tables from all possible Huffman tables using a first encryption key;

generating a coding sequence for the active Huffman tables using a second encryption key; and encrypting the digital data into an encrypted bit stream by the active Huffman tables with the coding sequence; and wherein the network-connected computer is further configured to transmit the encrypted bit stream to the client computer.

24. The encoding system according to claim 23, further comprising a non-encrypting decoder associated with the encryption encoder and configured to receive media data from a content providing computer, wherein the non-encrypting decoder decodes the media data from the content providing computer into the digital data and the encryption encoder encodes the digital media data into the encrypted bit stream.

25. A decrypting system for decoding the encrypted bit stream in claim 23, the decrypting system comprising:

a client computer configured to receive the encrypted bit stream from the network-connected computer; and a decryption decoder associated with the client computer for decrypting the encrypted bit stream, the decryption decoder being a computer program product comprising a computer-useable medium having computer-readable program code executable to implement a method for decrypting the encrypted bit stream, the method comprising:

generating all possible Huffman tables based on the selected image parameter;

generating the predetermined number of active Huffman tables from all possible Huffman tables using a first input key when the first input key is matched with a first encryption key;

generating the coding sequence for the active Huffman tables using a second input key when second input key is matched with a second encryption key; and decrypting the encrypted bit stream with the active Huffman tables arranged in the coding sequence.

* * * * *